United States Patent
Yrigoyen

(10) Patent No.: US 6,290,248 B1
(45) Date of Patent: Sep. 18, 2001

(54) UNIVERSAL DOLLY ATTACHMENT DEVICE

(76) Inventor: Joe Yrigoyen, 7645 Wilbur, Reseda, CA (US) 91335

( * ) Notice: Subject to any disclaimer, the term of this patent is extended or adjusted under 35 U.S.C. 154(b) by 0 days.

(21) Appl. No.: 09/510,991

(22) Filed: Feb. 22, 2000

Related U.S. Application Data

(63) Continuation-in-part of application No. 09/005,964, filed on Jan. 12, 1998, now abandoned.

(51) Int. Cl.[7] .............................. B60D 1/07; B60D 1/173; B62D 13/04
(52) U.S. Cl. .................................. 280/476.1; 280/416.1; 280/443; 280/459; 280/460.1
(58) Field of Search ............... 280/415.1, 416.1, 280/417.1, 426, 442, 443, 432, 433, 476.1, 460.1, 459, 457, 456.1, 511

(56) References Cited

U.S. PATENT DOCUMENTS

| | | | |
|---|---|---|---|
| 2,612,385 | * 9/1952 | Pilz | 280/443 |
| 3,476,405 | * 11/1969 | Cunha . | |
| 4,171,825 | * 10/1979 | Woodell | 280/443 |
| 4,345,775 | * 8/1982 | Merrifield | 280/443 |
| 4,451,058 | * 5/1984 | Curry | 280/443 |
| 4,645,226 | * 2/1987 | Gustavsson et al. | 280/476.1 |
| 4,759,563 | * 7/1988 | Nash | 280/476.1 |
| 5,788,257 | * 8/1998 | Meyerhofer | 280/443 |

FOREIGN PATENT DOCUMENTS

| | | | |
|---|---|---|---|
| 093 016 909 | * 9/1993 | (WO) | 280/433 |
| 2342861 | * 9/1993 | (FR) | 280/493 |

* cited by examiner

Primary Examiner—Ann Marie Boehler
(74) Attorney, Agent, or Firm—Robert M. Sperry

(57) ABSTRACT

An improved trailer dolly having a fifth wheel and also carrying a ball-type trailer hitch to give the driver the option of towing either type of trailer and having steering means built into the dolly to provide sure and positive steering and control of the towed trailer.

30 Claims, 5 Drawing Sheets

UNIVERSAL DOLLY ATTACHMENT DEVICE

RELATED APPLICATIONS

This application is a Continuation-In-Part of my copending U.S. patent application Ser. No. 09/005,964, filed Jan. 12, 1998, and now abandoned.

FIELD OF INVENTION

This invention relates to vehicle trailers and is particularly directed to improved dolly means for attaching trailers to automobiles, pickup trucks and the like.

PRIOR ART

It is often necessary or desirable to tow trailers behind automobiles, pickup trucks and the like. Unfortunately, these vehicles are not normally equipped for such towing. Some trailers have relatively low attaching tongues which can be attached to ball-type trailer hitches mounted on the rear bumper of the towing vehicle. Other trailers have relatively high attaching tongues and require that a fifth wheel be mounted on the bed of the towing vehicle. Obviously, the latter type of trailers cannot be towed by conventional automobiles, since there is no place to mount the fifth wheel; and, even on pickup trucks, the fifth wheel occupies a significant area within the bed of the pickup which severely limits the load carrying ability of the truck. Also, each of these types of trailer hitch requires that the towing vehicle bear the weight of the trailer, despite the fact that many towing vehicles are not designed for this. Furthermore, no means has been provided heretofore which would enable a vehicle to tow either type of trailer at the driver's option. Moreover, with either of the prior art types of trailer hitches, reversing or backing up with a trailer has been extremely difficult, if not impossible. Trailer dollies have been known to facilitate connecting trailers to tow vehicles. However, many of the prior art trailer dollies have failed to provide means for steering and control of the trailer. Moreover, none of the prior art trailer dollies have given the driver the option of towing either type of trailer. A search in the United States Patent Office has revealed the following:

| U.S. PAT. NO. | INVENTOR | ISSUED |
| --- | --- | --- |
| 5,407,221 | D. K. Haire et al | Apr. 18, 1995 |
| 3,212,793 | D. Petroroia | Oct. 19, 1965 |
| 4,345,775 | D. V. Merrifield | Aug. 24, 1982 |
| 5,067,741 | J. Ayme | Nov. 26, 1991 |
| 4,033,426 | E. J. Williams | Jul. 5, 1977 |
| 3,105,704 | A. G. Schramm | Oct. 1, 1963 |
| 1,503,135 | W. H. Sargent | Jul. 29, 1924 |
| 4,468,047 | J. R. McGhie et al | Aug. 28, 1984 |
| 5,364,117 | P. G. Keith | Nov. 15, 1994 |
| 5,348,331 | W. H. Hawkins | Sep. 20, 1994 |
| 4,824,135 | D. T. McGregor | Apr. 25, 1989 |
| 4,451,058 | N. R. Curry | May 29, 1984 |

Each of these references is subject to the disadvantages discussed above. Thus, none of the prior art trailer dollies have been entirely satisfactory.

BRIEF SUMMARY AND OBJECTS OF INVENTION

These disadvantages of the prior art are overcome with the present invention and an improved trailer dolly is provided which accommodates both high tongue and low tongue trailers without requiring the towing vehicle to bear the weight of the trailer and which provides cure and positive steering and control of the towed vehicle, even when backing up.

These advantages of the present invention are preferably attained by providing an improved trailer dolly having a fifth wheel and also carrying a ball-type trailer hitch to give the driver the option of towing either type of trailer and having steering means built into the dolly to provide sure and positive steering and control of the towed trailer.

Accordingly, it is an object of the present invention to provide an improved trailer dolly.

Another object of the present invention is to provide an improved trailer dolly which can accommodate either low tongue or high tongue trailers.

An additional object of the present invention is to provide an improved trailer dolly which allows the driver the option of towing either low tongue or high tongue trailers.

A further object of the present invention is to provide an improved trailer dolly which does not require the towing vehicle to bear the weight of the trailer.

Another object of the present invention is to provide an improved trailer dolly having steering means to facilitate steering and control of the dolly.

An additional object of the present invention is to provide an improved trailer dolly which provides sure and positive steering and control of the towed trailer, even when backing up.

A specific object of the present invention is to provide an improved trailer dolly having a fifth wheel and also carrying a ball-type trailer hitch to give the driver the option of towing either type of trailer and having steering means built into the dolly to provide sure and positive steering and control of the towed trailer.

These and other objects and features of the present invention will be apparent from the following detailed description, taken with reference to the figures of the accompanying drawing.

DETAILED DESCRIPTION OF THE INVENTION

Figure 1:
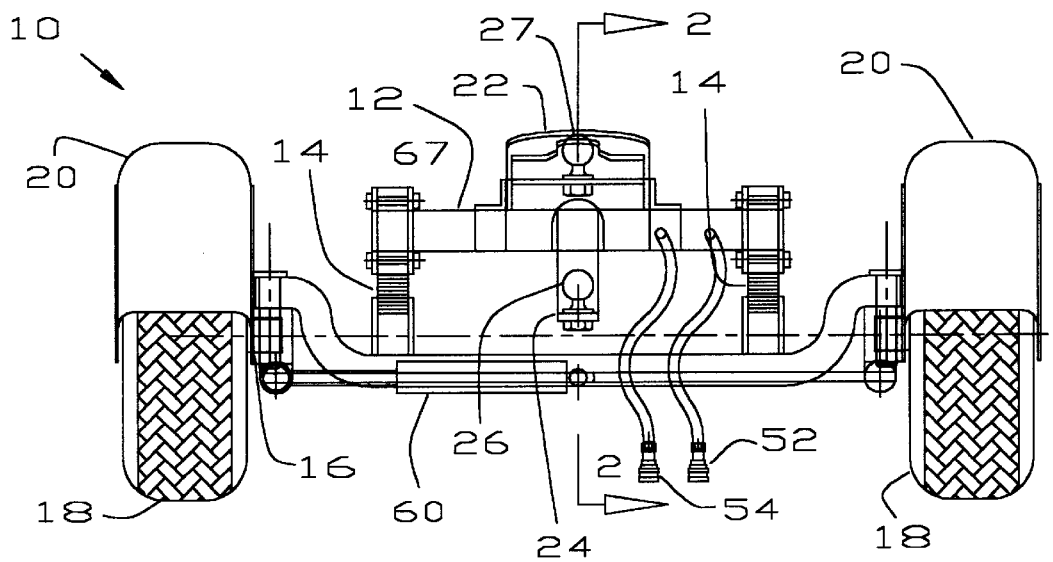
FIG. 1 is a rear view of a trailer dolly embodying the present invention.
Figure 2:
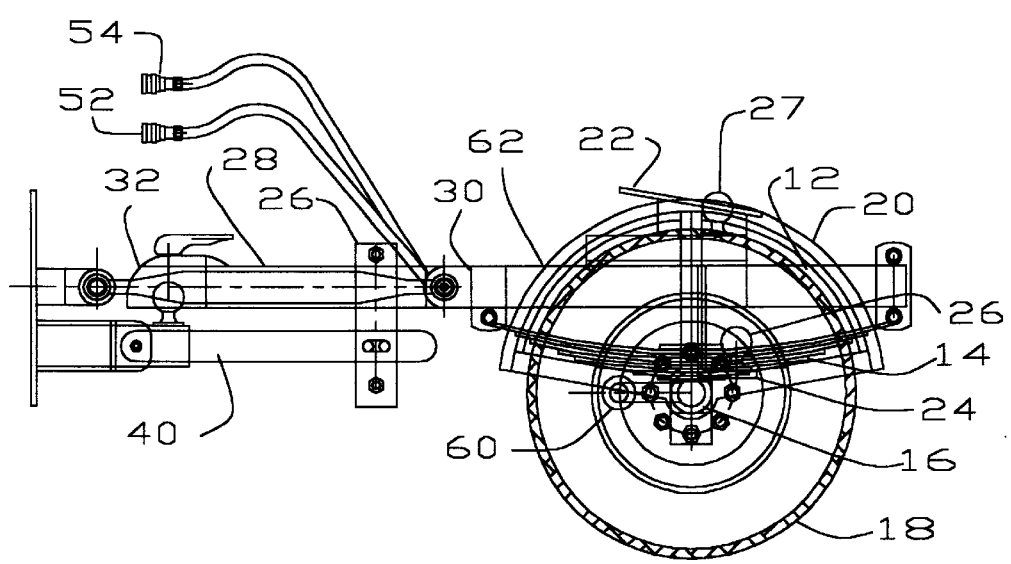
FIG. 2 is a vertical section through the trailer dolly of FIG. 1, taken on the line 2—2 of FIG. 1.
Figure 3:
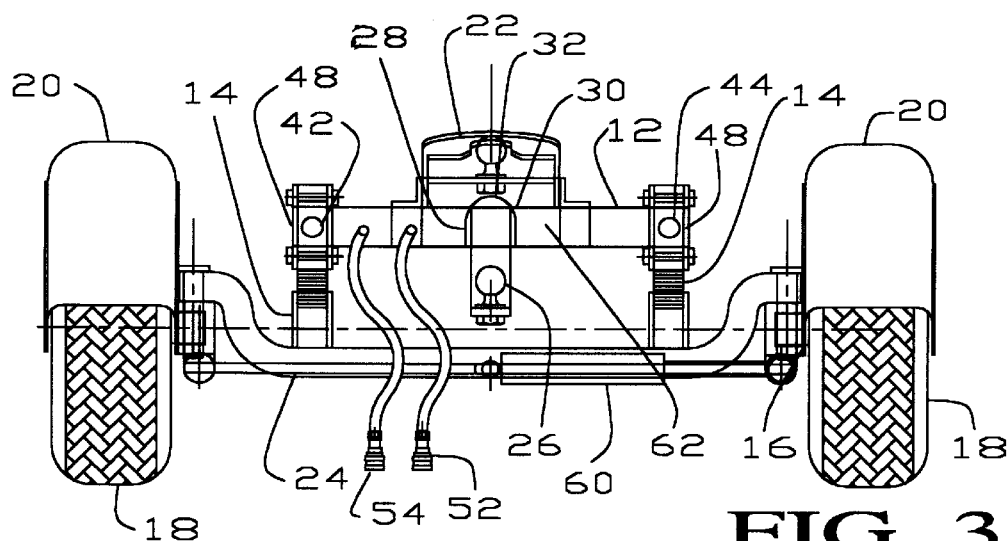
FIG. 3 is a front view of the trailer dolly of FIG. 1.
Figure 4:
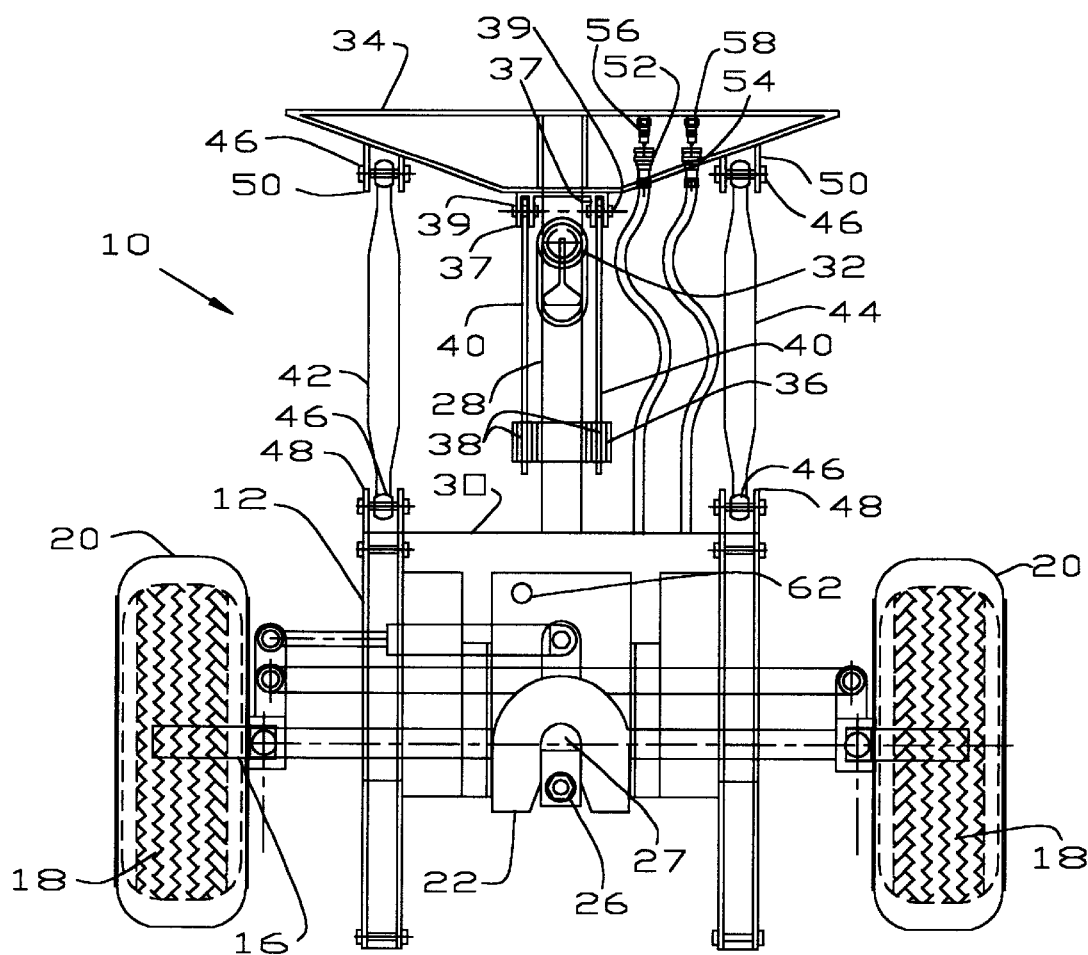
FIG. 4 is a plan view of the trailer dolly of FIG. 1.
Figure 6:
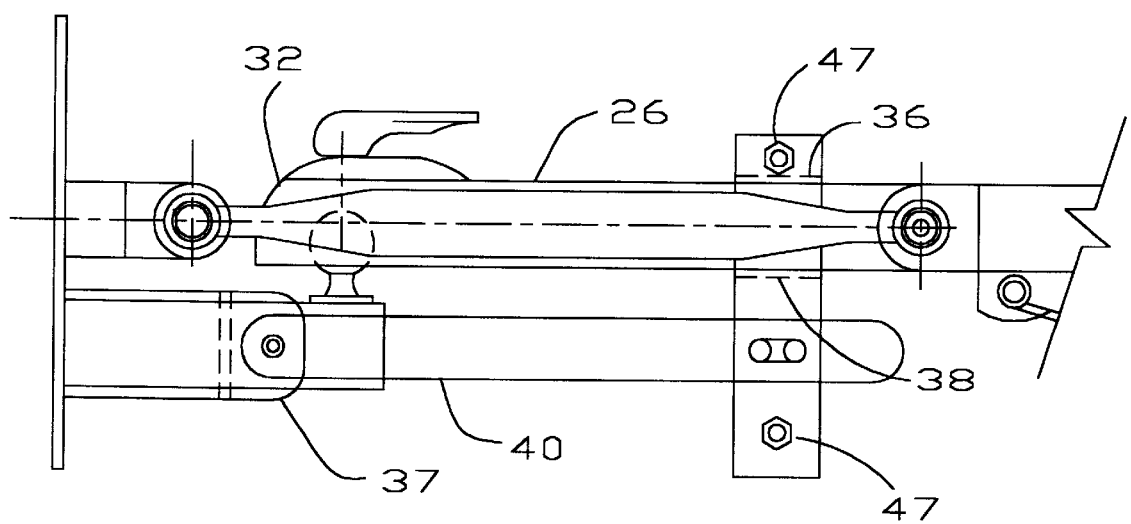
FIG. 6 is an enlarged side view of the friction bars of the dolly of FIG. 1.
Figure 7:
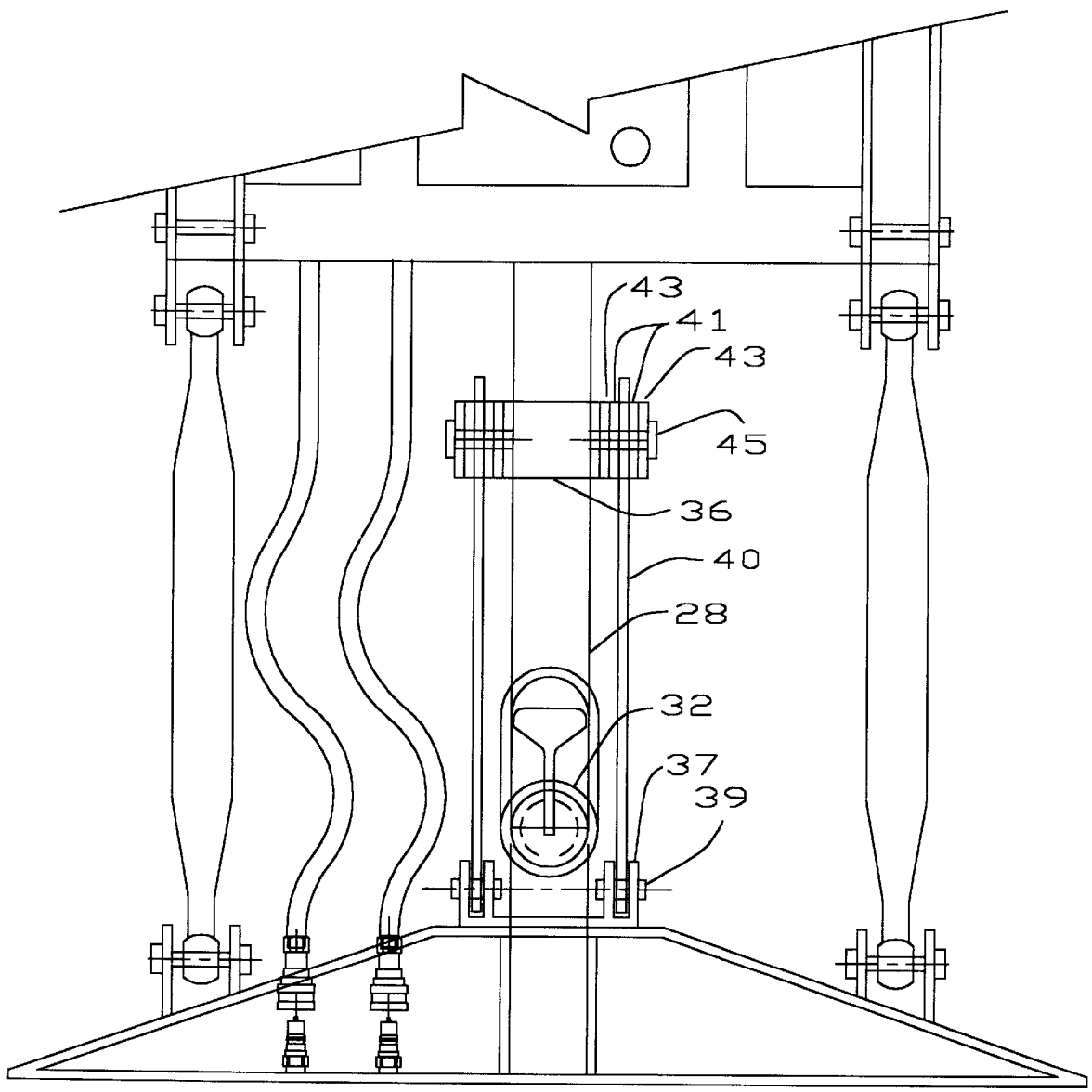
FIG. 7 is a plan view of the friction bars of FIG. 6.

In that form of the present invention chosen for purposes of illustration, FIG. 1 shows a trailer dolly, indicated generally at 10, having a frame 12 supported by springs 14 upon an axle 16 having wheels 18 mounted at each end. As shown, fenders 20 are mounted on the axle 16 and extend above the wheels 18. The frame 12 supports a fifth wheel 22 and has a lower portion 24 upon which is mounted a ball mount 26. Also, if desired, an additional ball mount 27 may be located adjacent the fifth wheel 22 to permit connection of a towed vehicle having a gooseneck coupling. The frame 12 has a tongue 28 which projects from the forward edge 30 of the frame 12 and caries suitable coupling means 32 for coupling the tongue 28 to a towing vehicle, as seen at 34 in FIG. 4. As best seen in FIGS. 6 and 7, the tongue 28 carries a crossbar 36 and 38, located adjacent the rear end of the tongue 28 and has friction bars 40 connecting the crossbar 36 on each side of the tongue 28 which project forwardly of the coupling means 32 and are attached to the towing vehicle 34 by suitable means, such as U-brackets 37 and bolts 39. The friction bars 40 have ball joints, not shown, where they enter the U-brackets 37 to permit limited rotation in the roll and pitch planes. Crossbar 36 carries a pair of friction plates 41 flanking each of the friction bars 40, formed of material similar to that of brake linings, and carries squeeze plates 43 which are urged by bolts 45 and nuts 47 to cause the friction plates 43 to bear against the friction bars 40. Tightening or loosening nuts 47 serves to adjust the amount of friction applied by the friction plates 41 against the friction bars 40. This structure serves to restrict vertical movement of the tongue 28 with respect to the towing vehicle 34. In addition, stabilizer bars 42 and 44, having ball joints 46 at each end, are connected between brackets 48, mounted on the front edge 30 of the frame 12 and similar brackets 50 mounted on the rear of the towing vehicle 34, as seen in FIG. 4. It is important that the brackets 48 be more closely spaced than the brackets 50 and that the stabilizer bars 42 and 44 be longer than the length of tongue 28, as this precludes jack-knifing of the dolly 10. Finally, a pair of hydraulic hoses 52 and 54 are connected to hydraulic ports 56 and 58, provided on the rear end of the towing vehicle 34, as best seen in FIG. 4, and are connected to respective ends of a double-acting cylinder 60 mounted on the axle 16 and serving to steer the wheels 18. A suitable hydraulic reservoir 62 is mounted on the frame 12 and serves to supply hydraulic fluid to cylinder 60 and, thence, to the entire hydraulic system, as best seem in FIG. 5.

Figure 5:
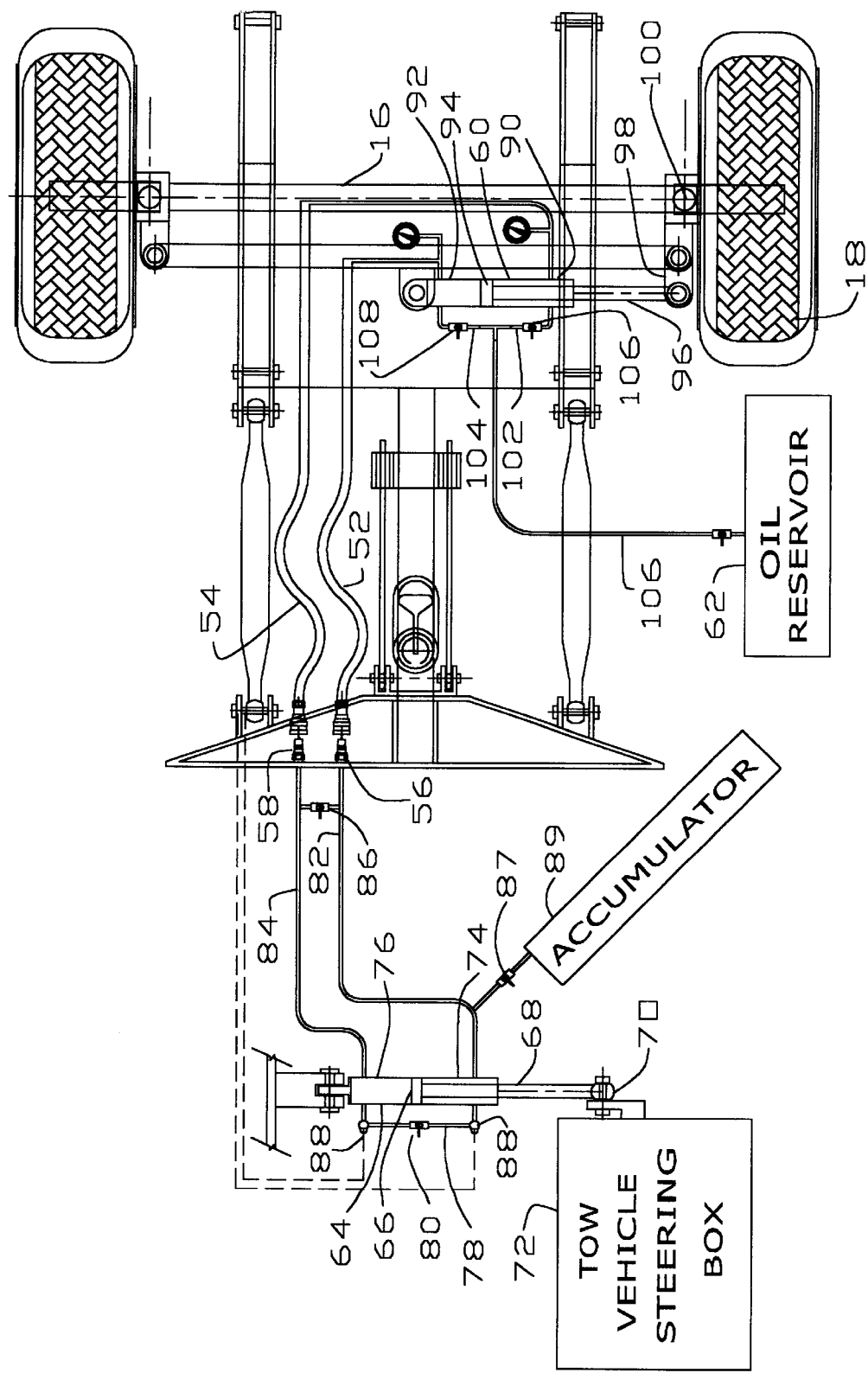
FIG. 5 is a diagrammatic representation showing the hydraulic system of the present invention.

As best seen in FIG. 5, the towing vehicle carries a hydraulic cylinder 64 having a piston 66 which is positioned by an arm 68 coupled to pitman arm 70 to the steering box 72 of the towing vehicle 34. The opposite ends 74 and 76 of the cylinder 64 are connected by hose 78, which is controlled by valves 88 and petcock 80 to regulate flow between the ends 74 and 76 of the cylinder 64. End 74 of cylinder 64 is connected by hose 82 to deliver hydraulic fluid to hydraulic port 56, while end 76 of cylinder 64 is connected by hose 84 to deliver hydraulic fluid to hydraulic port 58. A ball valve 86 is connected between hydraulic ports 56 and 58 and, when open, allows hydraulic fluid to circulate freely from end 74 of cylinder 64 through hose 82, valve 86 and hose 84 to end 76 of cylinder 64 and vice versa. When ball valve 86 is closed, the hydraulic fluid is delivered through hydraulic ports 56 and 58 to the towed vehicle. Between cylinder end 74 and valve 86 there is a valve 87 connected to an accumulator 89. Note that valves 88 must be open or closed in correspondence with valves 86 and 87. From the hydraulic ports 56 and 58, the hydraulic fluid passes through hoses 52 and 54 to respective ends 90 and 92 of the double acting cylinder 60. Cylinder 60 contains a piston 94 which is connected by piston rod 96 to steering arm 98, which is adjustably connected to control the steering knuckle 100 of axle 16 and, hence, serves to steer the wheels 18. The fact that steering arm 98 is directly coupled to the steering knuckle 100 causes the dolly to turn simultaneously with the steering mechanism of the towing vehicle 34. Also, the fact that the steering arm 98 is adjustably connected enables the driver to adjust this connection to cause the dolly 10 to track precisely with the towing vehicle 34. Ends 90 and 92 of the double-acting cylinder 60 are connected by hoses 102, 104 and 106 to the hydraulic reservoir 62 and flow is regulated by valves 107 and 108.

With the hydraulic system of FIG. 5, it will be seen that, when the driver of the towing vehicle 34 turns his steering wheel to turn the front wheels, not shown, of the towing vehicle 34, this will move the steering box 72, which will drive pitman arm 70 and piston rod 68 to reposition the piston 66 of hydraulic cylinder 64. This will cause hydraulic fluid to be discharged from one end 74 or 76 of cylinder 64 and will act, through hoses 82 and 84, hydraulic ports 56 and 58, and hoses 52 and 54 to double-acting cylinder 60 and will cause a corresponding repositioning of piston 94, which will act through piston rod 96 and steering arm 98 to rotate the steering knuckle 100 and, hence, to cause corresponding turning of the wheels 18 of the dolly 10. Thus, by appropriate adjustment of the connection of steering arm 98 to the steering knuckle 100, the dolly 10 can be made to always precisely follow the movements of the towing vehicle 34. This is further ensured by the fact that the stabilizer bars 42 and 44 are connected to the towing vehicle at points 50 which are spaced farther apart than the points 48 at which the stabilizer bars 42 and 44 are attached to the dolly 10 and the stabilizer bars 42 and 44 are longer than the length of the tongue 28. This connection precludes rotation of the dolly 10 about the vertical yaw axis, while allowing rotation about the longitudinal roll axis and the transverse pitch axis. Consequently, jack-knifing of the dolly 10 is precluded. Also, extreme pitching movement, such as would allow the towing vehicle to flip backward in top of the trailer, is precluded by the fact that the attaching points 46 of the stabilizer bars 42 and 44 with the towing vehicle 34 are not on a common line with the attaching point 32 of the tongue 28, as clearly seen in FIG. 4.

In use, the user connects the trailer dolly 10 to the towing vehicle 34 by means of coupling means 32 and connects the trailer, not shown, to either the fifth wheel 22 or to the ball mounts 26 and 27, as appropriate. In this way, the trailer dolly 10 bears the weight of the trailer, rather than the towing vehicle 34. Also, the trailer dolly 10 enables the towing vehicle 34 to be connected to the trailer regardless of which type of connection the trailer has. Stabilizer bars 42 and 44 are connected between the trailer dolly 10 and the towing vehicle 34 to preclude yawing of the trailer dolly 10 with respect to the towing vehicle 34, while the hydraulic system of FIG. 5 ensures precise tracking of the dolly 10 with the towing vehicle 34. Also, friction bars 40 are connected to towing vehicle 34 to restrict vertical movement at coupling means 32.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. A trailer dolly comprising:

a frame, an axle supporting said frame, steerable wheels mounted on each end of said axle, a fifth wheel mounted on said frame, a ball mount coupling mounted on said frame, means for steering said wheels from a towing vehicle, means for releasably connecting said dolly to be towed by said towing vehicle, a hydraulic reservoir mounted on said frame, a double acting cylinder mounted on said axle, means connecting said cylinder to steer said wheels, and means connecting said reservoir to supply hydraulic fluid to said cylinder to steer said wheels.

2. The trailer dolly of claim 1 further comprising:

spring supporting said frame on said axle.

3. The trailer dolly of claim 1 wherein said means for connecting said dolly to said towing vehicle comprises:

a tongue projecting forward from said frame, coupling means carried by said tongue for releasably connecting said tongue to a towing vehicle, and stabilizer bars located on each side of said tongue and connectable to said towing vehicle.

4. The trailer dolly of claim 3 further comprising:

said stabilizer bars being rigid members of greater length than said tongue and extending parallel to said tongue on opposite sides thereof and serving to connect said trailer with said towing vehicle.

5. The trailer dolly of claim 3 further comprising:

at least one friction bar carried by said tongue and projecting forward of said coupling means, a friction plate formed of high friction material engageable with said friction bar, a squeeze plate, means for adjustably squeezing said squeeze plate and said friction plate against said friction bar to restrict vertical movement of said tongue, and means connecting the forward end of said friction bar to said towing vehicle.

6. The dolly of claim 1 further comprising:

an additional ball mount located adjacent said fifth wheel to permit connection of a towed vehicle having a gooseneck coupling.

7. The dolly of claim 1 wherein said means for steering comprises:

a first double-acting hydraulic cylinder mounted on said towing vehicle, a first piston slideable within said first cylinder and having one end coupled for movement by the steering box of said towing vehicle, a second double-acting hydraulic cylinder mounted on said dolly, a second piston slideable within said second cylinder, means hydraulically coupling said first cylinder with said second cylinder such that movement of said first piston within said first cylinder will cause similar movement of said second piston within said second cylinder, and means rigidly yet adjustably connecting said second piston to control movement of said wheels.

8. A trailer dolly comprising:

a frame, a tongue projecting forwardly from said frame, coupling means carried by said tongue for releasably connecting said tongue to a towing vehicle, an axle supporting said frame, steerable wheels mounted on each end of said axle, a fifth wheel mounted on said frame, a ball mount coupling mounted on said frame, means for steering said wheels from a towing vehicle, at least one friction bar carried by said tongue and projecting forward of said coupling means, a friction plate formed of high friction material engageable with said friction bar, a squeeze plate, means for adjustably squeezing said squeeze plate and said friction plate against said friction bar to restrict pitching movement of said tongue, and means connecting the forward end of said friction bar to said towing vehicle.

9. The trailer dolly of claim 8 further comprising:

springs supporting said frame on said axle.

10. The dolly of claim 8 further comprising:

an additional ball mount located adjacent said fifth wheel to permit connection of a towed vehicle having a gooseneck coupling.

11. A trailer dolly comprising:

a frame, an axle supporting said frame, steerable wheels mounted on each end of said axle, a fifth wheel mounted on said frame, a ball mount coupling mounted on said frame, means for steering said wheels from a towing vehicle, a tongue projecting forward from said frame, coupling means carried by said tongue for releasably connecting said tongue to a towing vehicle, at least one friction bar carried by said tongue and projecting forward of said coupling means, a friction plate formed of high friction material engageable with said friction bar, a squeeze plate, means for adjustably squeezing said squeeze plate and said friction plate against said friction bar to restrict vertical movement of said tongue, and stabilizer bars located on each side of said tongue and connectable to said towing vehicle.

12. The trailer dolly of claim 11 further comprising:

said stabilizer bars being rigid members of greater length than said tongue and extending parallel to said tongue on opposite sides thereof and serving to connect said trailer with said towing vehicle.

13. The trailer dolly of claim 10 wherein:

said stabilizer bars have ball joints located at each end thereof.

14. The dolly of claim 11 wherein said means for steering comprises:

a first double-acting hydraulic cylinder mounted on said towing vehicle, a first piston slideable within said first cylinder and having one end coupled for movement by a steering box of said towing vehicle, a second double-acting hydraulic cylinder mounted on said dolly, a second piston slideable within said second cylinder, means hydraulically coupling said first cylinder with said second cylinder such that movement of said first piston within said first cylinder will cause similar movement of said second piston within said second cylinder, and means rigidly yet adjustably connecting said second piston to control movement of said wheels.

15. A trailer dolly comprising:

a frame, an axle supporting said frame, steerable wheels mounted on each end of said axle, a fifth wheel mounted on said frame, a ball mount coupling mounted on said frame, means for steering said wheels from a towing vehicle, a first double-acting hydraulic cylinder mounted on said towing vehicle, a first piston slideable within said first cylinder and having one end coupled for movement by a steering box of said towing vehicle, a second double-acting hydraulic cylinder mounted on said dolly, a second piston slideable within said second cylinder, means hydraulically coupling said first cylinder with said second cylinder such that movement of said first piston within said first cylinder will cause similar movement of said second piston within said second cylinder, and means rigidly yet adjustably connecting said second piston to control movement of said wheels.

16. The trailer dolly of claim 15 further comprising:

spring supporting said frame on said axle.

17. The trailer dolly of claim 15 wherein said means for connecting said dolly to said towing vehicle comprises:

a tongue projecting forward from said frame, coupling means carried by said tongue for releasably connecting said tongue to a towing vehicle, and stabilizer bars located on each side of said tongue and connectable to said towing vehicle.

18. The trailer dolly of claim 17 further comprising:

said stabilizer bars being rigid members of greater length than said tongue and extending parallel to said tongue on opposite sides thereof and serving to connect said trailer with said towing vehicle.

19. The trailer dolly of claim 17 wherein:

said stabilizer bars have ball joints located at each end thereof.

20. The trailer dolly of claim 17 further comprising:

at least one friction bar carried by said tongue and projecting forward of said coupling means, a friction plate formed of high friction material engageable with said friction bar, a squeeze plate, means for adjustably squeezing said squeeze plate and said friction plate against said friction bar to restrict vertical movement of said tongue, and means connecting the forward end of said friction bar to said towing vehicle.

21. The dolly of claim 15 further comprising an additional ball mount located adjacent said fifth wheel to permit connection of a towed vehicle having a gooseneck coupling.

22. A trailer dolly comprising:

a frame, an axle supporting said frame, steerable wheels mounted on each end of said axle, a fifth wheel mounted on said frame, a ball mount coupling mounted on said frame, a tongue projecting forward from said frame, stabilizer bars located on each side of said tongue and connectable to said towing vehicle, means for steering said wheels from a towing vehicle, a first double-acting hydraulic cylinder mounted on said towing vehicle, a first piston slideable within said first cylinder and having one end coupled for movement by a steering box of said towing vehicle, a second double-acting hydraulic cylinder mounted on said dolly, a second piston slideable within said second cylinder, means hydraulically coupling said first cylinder with said second cylinder such that movement of said first piston within said first cylinder will cause similar movement of said second piston within said second cylinder, and means rigidly yet adjustably connecting said second piston to control movement of said wheels.

23. The trailer dolly of claim 22 further comprising:

spring supporting said frame on said axle.

24. The trailer dolly of claim 22 further comprising:

said stabilizer bars being rigid members of greater length than said tongue and extending parallel to said tongue on opposite sides thereof and serving to connect said trailer with said towing vehicle.

25. The trailer dolly of claim 22 wherein:

said stabilizer bars have ball joints located at each end thereof.

26. The dolly of claim 22 further comprising:

an additional ball mount located adjacent said fifth wheel to permit connection of a towed vehicle having a gooseneck coupling.

27. A trailer dolly comprising:

a frame, an axle supporting said frame, steerable wheels mounted on each end of said axle, a fifth wheel mounted on said frame, a ball mount coupling mounted on said frame, means for steering said wheels from a towing vehicle, a tongue projecting forwardly from said frame to connect said dolly to a towing vehicle, stabilizer bars located on each side of said tongue and connectable to said towing vehicle, said stabilizer bars being rigid members extending farther forward than said tongue and extending parallel to said tongue on opposite sides thereof and serving to connect said dolly with said towing vehicle to permit limited rolling motion of said dolly with respect to said towing vehicle, while preventing yawing and also serving to restrict pitching movement of said dolly with respect to said towing vehicle.

28. The trailer dolly of claim 27 further comprising:

spring supporting said frame on said axle.

29. The trailer dolly of claim 28 further comprising:

at least one friction bar carried by said tongue and projecting forward of said coupling means, a friction plate formed of high friction material engageable with said friction bar, a squeeze plate, means for adjustably squeezing said squeeze plate and said friction plate against said friction bar to restrict vertical movement of said tongue, and means connecting the forward end of said friction bar to said towing vehicle.

30. The dolly of claim 28 further comprising:

an additional ball mount located adjacent said fifth wheel to permit connection of a towed vehicle having a gooseneck coupling.

* * * * *